United States Patent
Ohki et al.

(10) Patent No.: US 9,545,760 B2
(45) Date of Patent: Jan. 17, 2017

(54) ISOTROPIC FIBER-REINFORCED THERMOPLASTIC RESIN SHEET, AND PROCESS FOR PRODUCTION AND MOLDED PLATE THEREOF

(75) Inventors: Takeru Ohki, Shizuoka (JP); Takeshi Naito, Shizuoka (JP); Yoshitaka Umemoto, Shizuoka (JP)

(73) Assignee: Teijin Limited, Osaka-shi (JP)

( * ) Notice: Subject to any disclaimer, the term of this patent is extended or adjusted under 35 U.S.C. 154(b) by 1187 days.

(21) Appl. No.: 12/063,191

(22) PCT Filed: Aug. 14, 2006

(86) PCT No.: PCT/JP2006/315999
§ 371 (c)(1),
(2), (4) Date: Feb. 7, 2008

(87) PCT Pub. No.: WO2007/020910
PCT Pub. Date: Feb. 22, 2007

(65) Prior Publication Data
US 2009/0104418 A1  Apr. 23, 2009

(30) Foreign Application Priority Data
Aug. 18, 2005  (JP) ................................. 2005-237459

(51) Int. Cl.
| | |
|---|---|
| *B29C 70/50* | (2006.01) |
| *B29C 43/00* | (2006.01) |
| *B29C 70/12* | (2006.01) |
| *C08J 5/04* | (2006.01) |
| *C08J 5/24* | (2006.01) |
| *B29K 101/12* | (2006.01) |
| *B29K 105/08* | (2006.01) |
| *B29K 307/00* | (2006.01) |

(52) U.S. Cl.
CPC ............ *B29C 70/502* (2013.01); *B29C 43/003* (2013.01); *B29C 70/12* (2013.01); *C08J 5/042* (2013.01); *C08J 5/24* (2013.01); *B29K 2101/12* (2013.01); *B29K 2105/0854* (2013.01); *B29K 2307/00* (2013.01); *C08J 2377/02* (2013.01); *Y10T 428/2495* (2015.01); *Y10T 428/249948* (2015.04)

(58) Field of Classification Search
CPC ...... B29C 43/003; B29C 70/12; B29C 70/502; C08J 2377/02; C08J 5/042; C08J 5/24; Y10T 428/2495; Y10T 428/249948
USPC .............................. 428/212, 213, 220, 300.1
See application file for complete search history.

(56) References Cited

U.S. PATENT DOCUMENTS

| | | | |
|---|---|---|---|
| 4,543,228 A | 9/1985 | Bingler | |
| 4,543,288 A | 9/1985 | Radvan et al. | |
| 4,915,896 A * | 4/1990 | Rachal et al. | ................ 264/511 |
| 4,921,518 A | 5/1990 | Allaire et al. | |
| 5,177,039 A * | 1/1993 | Allaire et al. | ............... 501/95.2 |

FOREIGN PATENT DOCUMENTS

| | | |
|---|---|---|
| EP | 0223450 A1 | 5/1987 |
| EP | 0331860 A1 | 9/1990 |
| JP | 02 225533 | 9/1990 |
| JP | 6206221 A | 7/1994 |
| JP | 752331 A | 2/1995 |
| JP | 797465 A | 4/1995 |
| JP | 9155862 A | 6/1997 |
| JP | 6206222 A | 7/1997 |

OTHER PUBLICATIONS

European Search Report dated Dec. 14, 2009.

* cited by examiner

*Primary Examiner* — Aaron Austin
*Assistant Examiner* — Lawrence Ferguson
(74) *Attorney, Agent, or Firm* — Norris McLaughlin & Marcus, P.A.

(57) ABSTRACT

An isotropic fiber-reinforced thermoplastic resin sheet wherein a chopped strand prepreg comprising a thermoplastic resin and a reinforcing fiber is layered so that the fiber orientation is random, the prepreg having a fiber volume fraction (Vf) of 20% to 50%, a length in the fiber axis direction of 15 to 45 mm, and a thickness of no greater than 0.13 mm, and the layered material is molded into sheet form by heating and pressing, and a molded plate obtained from the isotropic fiber-reinforced thermoplastic resin sheet. Even if the volume fraction of the reinforcing fiber is relatively low, a fiber-reinforced thermoplastic resin sheet and a molded plate that are excellent in terms of mechanical properties and their uniformity can be obtained.

6 Claims, No Drawings

ISOTROPIC FIBER-REINFORCED THERMOPLASTIC RESIN SHEET, AND PROCESS FOR PRODUCTION AND MOLDED PLATE THEREOF

This application is a 371 application of PCT/JP2006/315999 filed Aug. 14, 2006, which claims priority to the Japanese Patent Application 2005-237459 filed Aug. 18, 2005.

TECHNICAL FIELD

The present invention relates to a fiber-reinforced plastic and, more particularly, to an isotropic fiber-reinforced thermoplastic resin sheet and a process for the production thereof employing a chopped strand prepreg comprising a thermoplastic resin and a reinforcing fiber, and to a molded plate obtained from the sheet.

BACKGROUND ART

In recent years, reinforcing fiber materials such as carbon fiber, glass fiber, and aramid fiber have been made into composites with various types of matrix resins, and the fiber-reinforced plastics thus obtained have been widely used in various types of fields and applications. In the aerospace field where a high level of mechanical properties, heat resistance, etc. are required, and in the general industrial field, a thermosetting resin such as an unsaturated polyester resin, an epoxy resin, or a polyimide resin has conventionally been used as a matrix resin. However, in the aerospace field in particular, there has been a need to improve these matrix resins due to drawbacks such as brittleness and poor impact resistance. Furthermore, in the case of a thermosetting resin, when this is made into a prepreg, there is a problem with storage management of the prepreg due to the short shelf life of the resin, and there are also the problems that the ability to follow product shape is poor, the molding time is long thus giving low productivity, etc. On the other hand, in the case of a thermoplastic resin prepreg, impact resistance is excellent when it is in a composite material, prepreg storage management is easy, the molding time is short, and there is a possibility of the molding cost being reduced.

With regard to the fiber-reinforced thermoplastic resin prepreg employing a thermoplastic resin as a matrix, there are the following types from the viewpoint of the morphology of the reinforcing fiber and its orientation. There is (1) a prepreg formed from a thermoplastic resin and a reinforcing continuous fiber that is a unidirectionally aligned fiber sheet or a woven/knitted fabric, formed using a continuous fiber. Such a prepreg has the advantage that the fiber volume fraction can be increased and has excellent performance in terms of modulus of elasticity and strength in the fiber axis direction. However, when a single prepreg is considered, it is in-plane anisotropic, and when a product is molded, in order to ensure isotropy in its mechanical properties it is necessary to layer a plurality of prepregs in the fiber axis direction, directions perpendicular thereto, and directions oblique thereto. This inevitably causes an increase in the cost, and results in the problem that the products becomes thick. Furthermore, there is (2) a prepreg (chopped strand prepreg) employing chopped strands in which discontinuous fibers are used as the reinforcing fiber. This is a small-piece prepreg formed by cutting unidirectionally aligned strands (fiber bundles) employing a thermoplastic resin as a matrix into a fiber length of, for example, on the order of 25 mm to 50 mm. Such a prepreg has good flowability during molding, for example, flowability during stamping, and is suitable for producing moldings with various complicated shapes. However, since it is essential to employ a mechanism for fluidizing the reinforcing fiber with the resin during molding, there is the problem that the volume fraction of the reinforcing fiber cannot be made high. Furthermore, there is the problem that, since the volume fraction of the reinforcing fiber is low and the reinforcing fiber is short, properties such as modulus of elasticity and strength are poor compared with one employing a continuous fiber.

JP-A-9-155862 (Patent Publication 1) (JP-A denotes a Japanese unexamined patent application publication) states that, in order to provide a fiber-reinforced thermoplastic resin sheet having a high weight fraction of a reinforcing fiber and good dispersion properties, for which the strength and the modulus of elasticity are pseudoisotropic within the plane and the flowability of the reinforcing fiber during post-processing is good, it is necessary to satisfy the following three requirements, that is, (1) the weight fraction of the reinforcing fiber is 50% to 85% and the weight fraction of the thermoplastic resin is 15% to 50%, (2) the average fiber length of the reinforcing fiber is 5 mm to 50 mm, and (3) the reinforcing fibers are dispersed non-directionally. However, Patent Publication 1 employs glass fiber in particular as the reinforcing fiber and has the object of increasing the weight fraction of the glass fiber, and does not propose one having excellent mechanical properties even with a low volume fraction of the reinforcing fiber.
(Patent Publication 1) JP-A-9-155862

DISCLOSURE OF INVENTION

Problems to be Solved by the Invention

It is an object of the present invention to provide a fiber-reinforced thermoplastic resin sheet by using a chopped strand prepreg comprising a thermoplastic resin and a reinforcing fiber, the fiber-reinforced thermoplastic resin sheet being excellent in terms of mechanical properties and their uniformity even for a relatively low volume fraction of the reinforcing fiber. It is another object to provide an isotropic molded plate employing such a fiber-reinforced thermoplastic resin sheet.

Means for Solving the Problems

The invention according to Claim 1 of the present invention is an isotropic fiber-reinforced thermoplastic resin sheet wherein a chopped strand prepreg comprising a thermoplastic resin and a reinforcing fiber is layered so that the fiber orientation is random, the prepreg having a fiber volume fraction (Vf) of 20% to 50%, a length in the fiber axis direction of 15 to 45 mm, and a thickness of no greater than 0.13 mm, and the layered material is molded into sheet form by heating and pressing.

The invention according to Claim 3, which is another embodiment of the present invention, is a molded plate in which one or a layered plurality of the fiber-reinforced thermoplastic resin sheets according to Claim 1 are integrally molded, the theoretical number of layers of the plate satisfying the following expression.

$$\text{Theoretical number of layers} = (\text{thickness of molded plate})/(\text{thickness of one prepreg}) \geq 10$$

The invention according to Claim 5, which is yet another embodiment of the present invention, is a process for the production of an isotropic fiber-reinforced thermoplastic resin sheet, the process comprising layering a chopped strand prepreg comprising a thermoplastic resin and a reinforcing fiber so that the fiber orientation is random, the prepreg having a fiber volume fraction (Vf) of 20% to 50%, a length in the fiber axis direction of 15 to 45 mm, and a thickness of no greater than 0.13 mm, and subsequently heating and pressing the layered material.

Effects of the Invention

The fiber-reinforced thermoplastic resin sheet of the present invention and the molded plate obtained therefrom have excellent properties such as strength and modulus of elasticity, these properties being isotropic, compared with a conventional fiber-reinforced thermoplastic resin sheet and molded plate, since the reinforcing fiber is randomly dispersed within the plane even though the fiber volume fraction of the reinforcing fiber is low. 'Isotropic' in the present invention means that mechanical properties such as strength and modulus of elasticity do not vary with direction and are substantially uniform.

BEST MODE FOR CARRYING OUT THE INVENTION

The fiber-reinforced thermoplastic resin sheet of the present invention employs a chopped strand prepreg comprising a thermoplastic resin and a reinforcing fiber, the chopped strand prepreg being a small-piece prepreg in which unidirectionally aligned strands (fiber bundles) having the thermoplastic resin as a matrix are cut into a fiber length of, for example, on the order of 25 mm to 50 mm. As the thermoplastic resin, there can be cited one or more types of resins, etc. selected from the group consisting of polypropylene, polysulfone, polyether sulfone, polyether ketone, polyether ether ketone, aromatic or aliphatic polyamide, aromatic polyester, aromatic polycarbonate, polyether imide, polyarylene oxide, thermoplastic polyimide, polyamide imide, polybutylene terephthalate, polyethylene terephthalate, polyethylene, and acrylonitrile butadiene styrene. Depending on the intended application, it may be used as a mixture in which part is a thermosetting resin. Among them, polyamide, polypropylene, polycarbonate, and acrylonitrile butadiene styrene (ABS) resins, which have excellent heat resistance, modulus of elasticity, and chemical resistance, are particularly preferable. These thermoplastic resins may contain colorants or various types of additives that are normally used.

The prepreg of the present invention has a fiber volume fraction (Vf) of 20% to 50%, and preferably 20% to 45%, and the volume fraction of the thermoplastic resin is therefore 80% to 50%, and preferably 80% to 55%, the fiber content being rather low compared with a normal prepreg. When the reinforcing fiber is expensive, this is therefore advantageous in terms of cost. It is not desirable for the fiber volume fraction (Vf) to exceed 50% since, although values for mechanical properties increase, many voids, etc. are formed and the resulting fiber-reinforced thermoplastic resin sheet does not have uniform properties in some cases. Furthermore, it is necessary that the prepreg has a length in the fiber axis direction of 15 to 45 mm, and a thickness of no greater than 0.13 mm, and preferably no greater than 0.1 mm. It is not desirable for the length in the fiber axis direction of the prepreg to exceed 45 mm or for the thickness of the prepreg to exceed 0.13 mm since the isotropy of the resulting fiber-reinforced thermoplastic resin sheet is easily lost and high levels of properties cannot be obtained. Therefore, in the present invention, unless the volume fraction, the fiber length, and the thickness satisfy the above-mentioned requirements, a fiber-reinforced thermoplastic resin sheet that has adequate mechanical properties and that is isotropic cannot be obtained.

The reinforcing fiber that can be used in the present invention is an inorganic fiber, an organic fiber, a metal fiber, or a fiber formed from a mixture thereof. Examples of the inorganic fiber include carbon fiber, graphite fiber, silicon carbide fiber, alumina fiber, tungsten carbide fiber, boron fiber, and glass fiber. Examples of the organic fiber include aramid fiber, high density polyethylene fiber and, in addition, normal nylon and polyester fibers. As the metal fiber, a fiber made of stainless steel, iron, etc. may be used, and there is also carbon fiber, etc. coated with a metal. It is particularly preferable to use carbon fiber. In the case of carbon fiber, it is preferable to use strands of 800 to 1600 tex with 12 K to 24 K filaments.

The chopped strand prepreg of the present invention is obtained by paralleling strands (fiber bundles) of a reinforcing fiber so that the thickness is no greater than 0.13 mm, subsequently applying a thermoplastic resin to the paralleled fiber bundles so that the fiber volume fraction (Vf) is in the range of 20% to 50%, and cutting the fiber-reinforced thermoplastic resin sheet thus formed so that, with respect to the longitudinal direction, the width is as desired, preferably 10 to 30 mm, and the length in the fiber axis direction is in the range of 15 to 45 mm. The strands of reinforcing fiber may be untwisted or twisted, but when paralleling, the strands preferably have the fibers spread as far as possible. A method for applying the thermoplastic resin is not particularly limited. There are, for example, a method in which strands of reinforcing fiber are directly impregnated with a molten thermoplastic resin, a method in which a film-form thermoplastic resin is melted and strands of reinforcing fiber are impregnated therewith, and a method in which a powdered thermoplastic resin is melted and strands of reinforcing fiber is impregnated therewith. The method for cutting the strands of reinforcing fiber impregnated with the resin is not particularly limited, but a pelletizer or a cutter of the guillotine type or the Kodak type may be used.

Subsequently, the chopped strand prepreg thus obtained is uniformly deposited/layered so the orientation of fibers is random. With regard to a method for uniformly depositing/ layering the chopped strand prepreg randomly, there can be considered, for example in the case of continuous production, a method in which a prepreg obtained by cutting is made to fall under gravity directly from a high position and deposited on a belt conveyor with a steel belt, etc., a method in which air is blown into the path of fall or a baffle plate is mounted therein, etc. In the case of batch production, a method in which a cut prepreg is stored in a container, a transport system is mounted on a lower face of the container, and the prepreg is distributed to a mold, etc. for sheet production can be considered.

Subsequently, this layered material is subjected to heating and pressing by, for example, passing it together with the steel belt between hot rolls, or to interval pressing to thus melt the thermoplastic resin and integrate it with the reinforcing fiber, thereby giving an isotropic fiber-reinforced thermoplastic resin sheet. As a method for carrying out the integration, in addition to the above, there can be considered, for example, a method in which heating and cooling is continuously carried out by a belt press, a method in which, after preheating is carried out by a far-infrared heater, cold pressing is carried out, or a batch method in which a heating and cooling press is used. It is particularly preferable to use a method in which the chopped strand prepreg is layered on a steel belt so that the orientation of fibers is random, and the layered material is then subjected to a heating/pressing treatment at 150° C. to 400° C. and 0.1 to 10 MPa using a double belt press, an interval hot press, or a hot roll.

The fiber-reinforced thermoplastic resin sheet thus obtained may be used as an intermediate material for producing various FRP moldings. In particular, a molded plate obtained by integrally molding one or a layered plurality of the fiber-reinforced thermoplastic resin sheets of the present invention has uniform properties such as strength and modulus of elasticity independent of direction and, in particular, a molded plate having a theoretical number of layers that satisfies the expression theoretical number of layers=(thickness of molded plate)/(thickness of one prepreg)≥10, and preferably theoretical number of layers≥15, is highly useful. A method for producing such a molded plate is not particularly limited, and one or a layered plurality of the fiber-reinforced thermoplastic resin sheets may be molded by a die press method, an autoclave method, a heating/cooling press method, etc., thus giving a molded plate. In this process, in order to adjust the fiber volume fraction (Vf) or the resin content in the molded plate, a thermoplastic resin may be additionally layered as necessary. The content of the thermoplastic resin in the molded plate is normally 20 to 90 wt %, and preferably 30 to 80 wt %.

Among the molded plates thus obtained, those having a CV value for the flexural strength and the flexural modulus of elasticity measured in accordance with JIS K 7017 of no greater than 10 are particularly preferable. The CV value referred to here is an indicator showing the relative scatter (coefficient of variation) and is a value expressed by (standard deviation/average measurement)×100(%); the smaller this value the higher the precision of the measurement.

EXAMPLES

The present invention is explained in detail below by reference to Examples. Measurement of the fiber volume fraction was carried out in accordance with JIS K 7075. Measurement of the flexural strength and the flexural modulus of elasticity was carried out in accordance with JIS K 7017. The property retention (%) is a value expressed by (property value at 80° C./property value at room temperature)×100.

Example 1

PA6 film (nylon 6, manufactured by UNITIKA Ltd., weight per unit area 28.75 g/m$^2$) was placed on both sides of a carbon fiber strand sheet form material having a weight per unit area of 40 g/m$^2$ in which continuous fibers formed from HTA-12K carbon fiber (800 tex, strands with 12,000 filaments, manufactured by TOHO TENAX Co., Ltd.) were oriented in one direction, thus giving a sandwich-like layered material in which the sheet form material was held between the films. This layered material was heated at 230° C. to 260° C. to thus impregnated the sheet form material with molten PA6 film. The thickness of the resin-impregnated sheet form material thus obtained was 0.07 to 0.08 mm. The fiber volume fraction was 30%.

The resin-impregnated sheet form material obtained above was slit into a width of 20 mm (corresponding to 1 strand), and then while cutting it to a length of 25 mm using a guillotine type cutter the chopped strand prepreg thus obtained was made to fall and be deposited on a belt conveyor with a steel belt. The prepreg was layered on the steel belt so that the orientation of fibers was random. Subsequently, the layered material was subjected to a heating/pressing treatment at 230° C. to 260° C. and 0.5 to 1.5 MPa using a hot roll, thus giving a fiber-reinforced thermoplastic resin sheet of the present invention. The sheet thus obtained exhibited substantially isotropic mechanical properties.

After the isotropic fiber-reinforced thermoplastic resin sheet thus obtained was preheated at 260° C. to 280° C. by a far-infrared heater, it was subjected to a heating/pressing treatment at 80° C. to 120° C. and 40 to 50 MPa by a die press method, thus giving a molded plate of the present invention having a plate thickness of 2.3 mm (theoretical number of layers 28). The mechanical properties of this molded plate were as shown in Table 1.

Comparative Example 1

PA6 film (nylon 6, manufactured by UNITIKA Ltd., weight per unit area 28.75 g/m$^2$) was placed on both sides of a carbon fiber strand sheet form material having a weight per unit area of 80 g/m$^2$ in which continuous fibers formed from HTA-6K carbon fiber (400 tex, strands with 6,000 filaments, manufactured by TOHO TENAX Co., Ltd.) were oriented in one direction, thus giving a sandwich-like layered material in which the sheet form material was held between the films. This layered material was heated at 260° C. to thus impregnated the sheet form material with molten PA6 film. The resin-impregnated sheet form material thus obtained had a width of about 5 mm and a thickness of 0.26 mm (fiber volume fraction 50%). The treatments thereafter were carried out in the same manner as in Example 1, a fiber-reinforced thermoplastic resin sheet was prepared using a strand prepreg having a cut length of 25 mm and a width of 5 mm, and a molded plate having a thickness of 2.3 mm (theoretical number of layers 9) was obtained using the sheet. The mechanical properties of this molded plate were as shown in Table 1.

Comparing Example 1 (Vf=30%) with Comparative Example 1 (Vf=50%), it was expected that, since the amount of thermoplastic resin was large in Example 1, it would be considerably affected by heat, but compared with Comparative Example 1 the property retention was similar or slightly better. As shown in Table 1, in the case of Comparative Example 1, with regard to the values of properties for one corresponding to Vf=30%, the flexural modulus of elasticity was 23 GPa and the flexural strength was 319 MPa at room temperature.

Example 2 and Comparative Examples 2 and 3

The resin-impregnated sheet form material (width 20 mm) obtained in Example 1 was cut into three different lengths of 10 mm (Comparative Example 2), 40 mm (Example 2), and 50 mm (Comparative Example 3), and molded plates were produced therefrom in the same manner as in Example 1. The mechanical properties thereof were as shown in Table 1. When the length of the prepreg was 10 mm, which is short, (Comparative Example 2, outside the scope of the present invention), the mechanical properties of the molded plate, and in particular the flexural strength, were poor. When it was 50 mm, which is long, (Comparative Example 3, outside the scope of the present invention), although the mechanical properties were substantially the same as those with a length of 40 mm (Example 2, within the scope of the present invention), the CV value was 10 or greater (no greater than 10 in Example 2), that is, the property values varied widely, that is, the isotropy was poor.

Example 3 and Comparative Example 4

In the same type of experiment as in Example 1, the weight per unit area of the PA6 film was changed so as to adjust the fiber volume fraction of the prepreg to 15% (Comparative Example 4) and 45% (Example 3). Molded plates were molded in the same manner as in Example 1 using the prepregs obtained. The mechanical properties thereof were as shown in Table 1. It can be seen that one with a fiber volume fraction of 15% (Comparative Example 4, outside the scope of the present invention) did not have sufficient mechanical properties.

Examples 4 and 5 and Comparative Example 5

In the same type of experiment as in Example 1, the weight per unit area of the sheet form material and the weight per unit area of the PA6 film were changed so as to adjust the fiber volume fraction of the prepreg to 30%, and prepregs having a thickness of 0.15 mm (Comparative Example 5), 0.10 mm (Example 4), and 0.05 mm (Example 5) were obtained. In the case of, for example, a thickness of 0.15 mm, the weight per unit area of the sheet form material was adjusted to 80 g/m$^2$, and the weight per unit area of the PA6 film was adjusted to 57.5 g/m$^2$. Molded plates were produced in the same manner as in Example 1 using the prepregs thus obtained. The mechanical properties thereof were as shown in Table 1. It can be seen that the one with a thickness of 0.15 mm (Comparative Example 5, outside the scope of the present invention) was poor in terms of flexural strength in particular compared with those with a thickness of 0.10 mm (Example 4) and 0.05 mm (Example 5).

Comparative Example 6

This comparative example was a case in which a molded plate was produced using a normal carbon fiber nonwoven fabric instead of the chopped strand prepreg. After a carbon fiber-reinforced stampable sheet in which an HTA-12K carbon fiber nonwoven fabric (800 tex, strand with 12,000 filaments, manufactured by TOHO TENAX Co., Ltd.) and PA6 had been integrated was preheated at 260° C. to 280° C. by a far-infrared heater, it was subjected to a heating/pressing treatment at 80° C. to 120° C. by a die press method, thus giving a 3 mm thick molded plate. The mechanical properties thereof were as shown in Table 1. It can be seen that the fiber volume fraction was the same as that of Example 1 of the present invention, but the values for the mechanical properties were better for those of the present invention.

Comparative Example 7

In this comparative example, a 3 mm thick molded plate was produced by standard injection molding using, instead of the chopped strand prepreg, a chopped fiber (length 6 mm) of the same carbon fiber as in Example 1 and PA6 resin pellets. The mechanical properties of the molded plate thus obtained were as shown in Table 1. It can be seen that the fiber volume fraction was the same as that of Example 1 of the present invention, but the values for the mechanical properties were better for those of the present invention.

TABLE 1

| | Characteristics of prepreg | | | | Mechanical properties of molded plate | |
| --- | --- | --- | --- | --- | --- | --- |
| | Length (mm) | Thickness (mm) | Fiber volume fraction (%) | Measurement conditions | Flexural modulus of elasticity GPa (CV value %) | Flexural strength MPa (CV value %) |
| Ex. 1 | 25 | 0.07~0.08 | 30 | Room temperature | 24 (4) | 457 (6) |
| | | | | 80° C. | 21 | 291 |
| | | | | Property retention (%) | 85 | 64 |
| Comp. Ex. 1 | 25 | 0.26 | 50 | Room temperature | 38 | 532 |
| | | | | 80° C. | 32 | 321 |
| | | | | Property retention (%) | 85 | 60 |
| | | | 30 | Room temperature | 23 | 319 |
| Ex. 2 | 40 | 0.07 | 30 | Room temperature | 22 (9) | 437 (6) |
| Comp. Ex. 2 | 10 | 0.07 | 30 | Room temperature | 20 (5) | 358 (4) |
| Comp. Ex. 3 | 50 | 0.07 | 30 | Room temperature | 23 (13) | 442 (11) |
| Comp. Ex. 4 | 25 | 0.07 | 15 | Room temperature | 12 | 228 |
| Ex. 3 | 25 | 0.07 | 45 | Room temperature | 36 | 685 |
| Ex. 4 | 25 | 0.10 | 30 | Room temperature | 24 | 440 |
| Ex. 5 | 25 | 0.05 | 30 | Room temperature | 24 | 465 |
| Comp. Ex. 5 | 25 | 0.15 | 30 | Room temperature | 22 | 400 |
| Comp. Ex. 6 | — | — | 30 | Room temperature | 17 | 341 |
| Comp. Ex. 7 | — | — | 30 | Room temperature | 21 | 331 |

INDUSTRIAL APPLICABILITY

The fiber-reinforced thermoplastic resin sheet of the present invention and the molded plate obtained therefrom have excellent properties such as strength and modulus of elasticity and, moreover, since these properties are isotropic, they are suitable as materials for molding FRP moldings with various shapes.

What is claimed is:

1. A molded plate in which one fiber-reinforced thermoplastic resin sheet or a layered plurality of fiber-reinforced thermoplastic resin sheets are integrally molded, the molded plate comprising:
    an isotropic fiber-reinforced thermoplastic resin sheet comprising a layered material molded into sheet form by heating and pressing, the layered material being a chopped strand prepreg, comprising a thermoplastic resin as a matrix and a reinforcing fiber, that is layered so that the fiber orientation is random, the prepreg having a fiber volume fraction of 20% to 50%, a length in the fiber axis direction of 15 to 45 mm, and a thickness of no greater than 0.13 mm, and
    the theoretical number of layers of the molded plate satisfying the following expression:

theoretical number of layers=(thickness of molded plate)/(thickness of one prepreg)≥10.

2. The molded plate according to claim 1, wherein the reinforcing fiber is carbon fiber.

3. The molded plate according to claim 1, wherein CV values of the molded plate for flexural strength and flexural modulus of elasticity measured in accordance with JIS K 7017 are no greater than 10.

4. The molded plate according to claim 1, wherein the prepreg has a thickness of 0.05-0.10 mm.

5. The molded plate according to claim 1, wherein the theoretical number of layers is equal to or greater than 15.

6. The molded plate according to claim 1, wherein the prepreg has a width of 10 to 30 mm with respect to the longitudinal direction.

* * * * *